(12) United States Patent
Fitz-Gerald et al.

(10) Patent No.: US 11,604,298 B2
(45) Date of Patent: Mar. 14, 2023

(54) SUBSURFACE FAULT EXTRACTION USING UNDIRECTED GRAPHS

(71) Applicant: ExxonMobil Upstream Research Company, Spring, TX (US)

(72) Inventors: Dudley Braden Fitz-Gerald, Cheyenne, WY (US); Diego A. Hernandez, Tomball, TX (US); Cody J. MacDonald, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 128 days.

(21) Appl. No.: 17/248,561

(22) Filed: Jan. 29, 2021

(65) Prior Publication Data

US 2021/0247535 A1    Aug. 12, 2021

Related U.S. Application Data

(60) Provisional application No. 62/975,389, filed on Feb. 12, 2020.

(51) Int. Cl.
*G01V 1/30* (2006.01)
*G01V 1/28* (2006.01)

(52) U.S. Cl.
CPC .............. *G01V 1/306* (2013.01); *G01V 1/282* (2013.01); *G01V 1/302* (2013.01)

(58) Field of Classification Search
CPC ........ G01V 1/306; G01V 1/282; G01V 1/302; G01V 2210/642; G01V 1/301
See application file for complete search history.

(56) References Cited

U.S. PATENT DOCUMENTS

| 9,417,349 B1 * | 8/2016 | Yu .......................... G01V 1/302 |
| 2008/0071477 A1 * | 3/2008 | Li ............................ G01V 1/30 |
| | | 702/14 |
| 2019/0064378 A1 | 2/2019 | Liu et al. |

FOREIGN PATENT DOCUMENTS

WO        WO-9733184 A1 *  9/1997  ............... G01V 1/30

* cited by examiner

*Primary Examiner* — Mischita L Henson
(74) *Attorney, Agent, or Firm* — Lempia Summerfield Katz LLC

(57) ABSTRACT

A method for subsurface fault extraction using undirected graphs is provided. Extracting faults in the subsurface may assist in various stages of geophysical prospecting. To that end, an undirected graph may be used in order to identify distinctive fault branches in the subsurface. Fault probability data, from seismic data, may be used to establish connections in the undirected graph. Thereafter, some of the connections in the undirected graph may be removed based on analyzing one or more attributes, such as dip, azimuth, or context, associated with the connections or nodes associated with the connections. After which, the undirected graph may be analyzed in order to extract the faults in the subsurface.

20 Claims, 8 Drawing Sheets

SUBSURFACE FAULT EXTRACTION USING UNDIRECTED GRAPHS

CROSS REFERENCE TO RELATED APPLICATION

This application claims the benefit of priority of U.S. Provisional Application No. 62/975,389, filed Feb. 12, 2020, the disclosure of which is incorporated herein by reference in its entirety.

TECHNICAL FIELD

This disclosure relates generally to the field of geophysical prospecting and, more particularly, to seismic prospecting for hydrocarbon management and related data processing. Specifically, exemplary implementations relate to methods and apparatus for subsurface fault extraction using undirected graphs.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Interpretation of seismic data may include detecting and extracting fault objects in the subsurface. The extracted fault objects may in turn be used in one or more stages of geophysical prospecting, including in the exploration stage (e.g., to characterize the subsurface or to assist in geological modeling) and/or in the development stage (e.g., for well placement). In order to perform fault extraction, the seismic data is analyzed to identify fault presence therein (e.g., identifying edge detection attributes), and, in turn, perform fault extraction. One example fault extraction methodology includes leveraging geometric calculations to assess fit-to-plane measures and conditional triangulation. However, this fault extraction methodology may routinely under predict fault presence and may break continuous fault expressions into a multitude of patches, necessitating applying a series of post-processing steps that are time consuming and tedious.

SUMMARY

A computer-implemented method for extracting faults in a subsurface is disclosed. The method includes: accessing fault probability generated from seismic data; establishing connections in an undirected graph based on the fault probability; removing at least some connections in the undirected graph based on analyzing one or more attributes associated with the at least some connections or nodes associated with the at least some connections; and analyzing the undirected graph in order to extract the faults in the subsurface.

Alternatively, a computer-implemented method for extracting faults in a subsurface is disclosed. The method includes: accessing fault probability generated from seismic data; generating connections in an undirected graph based on the fault probability and based on orientation of the fault; and analyzing the undirected graph in order to extract the faults in the subsurface.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

FIGS. 4A and 4B illustrate the results of the skeletonization process in which FIG. 4A depicts a Z slice through a fault probability volume and in which FIG. 4B is the skeletonized result.

FIGS. 5A and 5B illustrate the result of fault orientation computation in which FIG. 5A depicts a skeletonized fault probability volume and in which FIG. 5B illustrates the fault orientations (e.g., azimuth and dip) computed therefrom.

DETAILED DESCRIPTION

Figure 1:
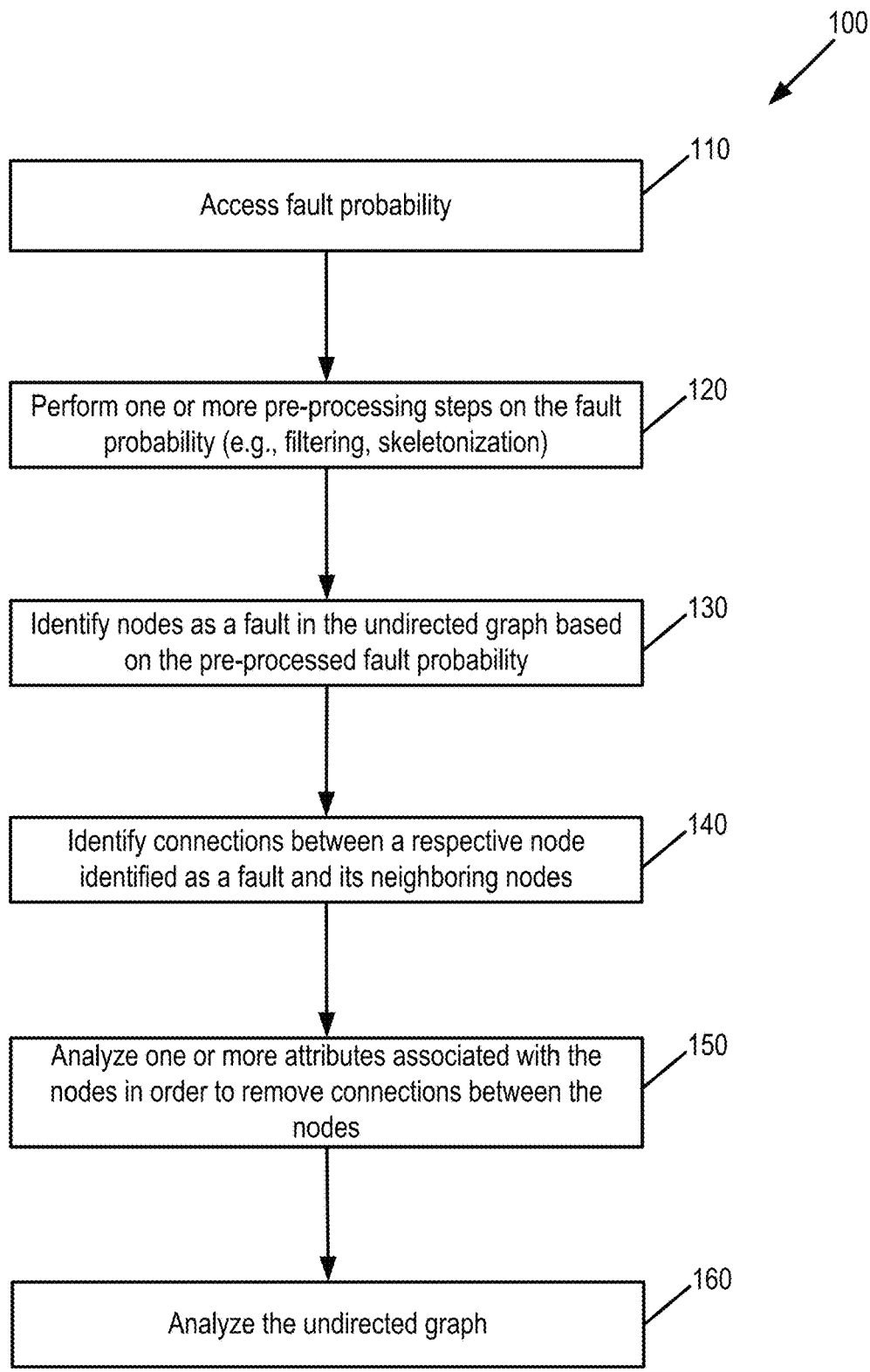
FIG. 1 is a flow diagram of a first example of extracting faults from seismic data.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (e.g., acoustic) data sets in conjunction with other geophysical data, including, for example, gravity plus seismic; gravity plus electromagnetic plus seismic data, etc. For example, joint-inversion utilizes multiple geophysical data types.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

One issue in seismic interpretation (such as fully automated seismic interpretation) is the ability to detect and extract fault objects in their entirety from edge detection attributes computed from seismic data. Problems faced in the automated fault extraction process include one or both of: (1) quality of the edge detection attribute; and (2) adequacy of the methodology to identify and extract planar features of multiple orientations with variable degrees of connectivity. With regard to (1), advances in image processing techniques and new methodologies (including algorithms for detecting fault presence in seismic data) have improved the quality of the edge detection attribute. However, as discussed in the background, with regard to (2), typical fault extraction methodologies are limited in their detection abilities, primarily leveraging geometric calculations for assessing fit-to-plane measures and conditional triangulation. In particular, the typical fault extraction methodologies may incorrectly identify two separate fault branches as overlapping or as being connected, resulting in routinely underpredicting fault presence and/or breaking continuous fault expressions into a multitude of patches that then must undergo a series of post-processing efforts.

In one or some embodiments, an undirected graph is used in order to identify distinctive fault branches in the subsurface. In particular, seismic data may be accessed in order to generate a fault volume. Thereafter, the undirected graph may be generated based on the fault volume. In one embodiment, the fault volume may undergo additional processing, such as one or both of filtering/preprocessing or skeletonizing, prior to being used to generate the undirected graph. Alternatively, the fault volume, without undergoing filtering/preprocessing or skeletonizing, is used to generate the undirected graph.

The fault volume, whether filtered/skeletonized or not, is subject to a transformation in order to generate the undirected graph. As one example transformation, the undirected graph is generated from and/or has information abstracted from the fault voxels from the fault probability volume. Further, one or more attributes or metrics may be associated with a fault voxel or a pair of fault voxels (e.g., such as an adjacent pair of fault voxels that define orientation and/or number of neighbors), which in turn may be used to filter the undirected graph, thereby separating fault features (e.g., separate the amalgamated fault features in to individual connected components). In this way, the undirected graph is a representation of relational indexing that conveys conditional connectivity (e.g., the individual connected components) in order to identify the connected components.

Thus, fault branches may be created from the fault attribute volume (e.g., a voxelized/discretized representation of faults). In particular, after filtering and/or skeletonization, the fault probability for a respective node may be analyzed.

For example, if the fault probability for the respective node indicates a fault (e.g., the fault probability=1), the respective node is established in the undirected graph. Note that fault probability may be set to 1 after skeletonization or other thinning (as discussed below), even where a raw fault probability is of a different value (e.g., 0.85, or 0.90, or the like). It will be appreciated that other values of fault probability may "indicate a fault" (e.g., where raw data rather than skeletonized or otherwise thinned data is used), such as equal to or greater than 0.7, 0.8, 0.9, or such other threshold value suitable for indicating the likely presence of a fault for a given context, as discussed below in connection with thinning techniques.

Further, connections may be established from the respective node where a fault is indicated (e.g., by fault probability value) by analyzing the fault probability for nodes in the neighborhood of the respective node. As one example, fault probabilities associated with the directly adjacent nodes to the respective node (e.g., the 26 adjacent nodes) may be analyzed. In particular, connections between the respective node and neighboring nodes may be established to a neighboring node responsive to determining that the fault probability for the neighboring node indicates a fault (e.g., the fault probability=1, or such other value as may be appropriate for the context as may be determined by a user, or pre-determined for a user). In this way, the connections may be established between nodes.

In one or some embodiments, the connections may be subject to further analysis based on one or more attributes associated with the nodes and/or the connections. Specifically, the further analysis may comprise analysis of the one or more attributes in order to determine whether to remove some of the previously established connections, thereby reducing the possibility of an overly-connected fault branch network. As one example, the undirected graph, which is indicative of the connectivity of the faults, may be used to separate the fault branches, such as by using attributes associated with the voxels (e.g., the nodes). Various attributes may be associated with the nodes, or may be associated with sets of nodes (e.g., an attribute defining a relationship between two nodes).

Merely by way of example, attributes associated with a node may include any one, any combination, or all of: fault probability (before or after skeletonization or other thinning); azimuth; dip; number of neighbors that exhibit a fault; or context (e.g., analysis of one or more other attributes for a volumetric indication of connected quality). Further, attributes may be associated with the connections, such as the delta azimuth (e.g., a change in azimuth from the respective node to one of its neighboring nodes) or the delta dip. One or more attributes may be analyzed in order to determine whether to remove previously established connections, as discussed further below. Thus, the attributes may be directly derived from the fault probability (either before or after skeletonization) and/or may be indirectly derived from the fault probability. In this way, transforming the representation of the fault data into an undirected graph, which may be subject to additional analysis of one or more attributes, is adept at extracting subsurface faults.

Referring to the figures, FIG. 1 is a flow diagram 100 of a first example of extracting faults from seismic data. At 110, a fault probability volume is accessed. Various types of fault probability volumes are contemplated. As examples, a fault probability volume (e.g., directed to a 3D space) or a fault probability area (e.g., directed to a 2D area) may be accessed. Further, the fault probability may be generated in one of a variety of ways. As one example, deep learning may be used to automatically generate the fault probability volume, such as disclosed in US Patent Application Publication No. 2019/0064378, incorporated by reference in its entirety. Other methodologies to generate the fault probability are contemplated. One particular advantage of an automatically generated fault probability volume (e.g., per 2019/0064378) may be the pixel-by-pixel (or in the case of volumes, voxel-by-voxel) generation of fault probability values, as opposed to generation of such values on a patch-by-patch basis. Such pixel-by-pixel, or voxel-by-voxel, probability value generation may particularly lend itself to the undirected graph connectivity analysis described herein.

At 120, one or more pre-processing steps on the fault probability may be performed. As one example, the fault probability may be filtered in order to correct the initially generated fault probability. In particular, the initially generated fault probability may display a number of limitations, such as noise and discontinuous prediction of fault presence. For example, the initially generated fault probability may not perfectly predict the faults, with the fault expressions being discontinuous in areas. To remedy these limitations in the initially generated fault probability, a series of filters and operations may be applied to improve fault expression and reduce computational overhead.

In particular, in order to extract continuous fault patches, it is preferred for the fault expression to be continuous as well. By applying the series of filters to the initially generated fault probability, the noise and "blur" fault probability attribute, which for local connections may be discontinuous, may be smoothed.

Various filters are contemplated, such as noise reduction filters (e.g., Gaussian, convolution, median, etc.) that may be structurally oriented. In particular, the filters may analyze a brick of data centered around a voxel and then update that particular value with the output of the algorithm. In this way, that brick of data may be aligned with the texture or fabric of the data so that the operational kernels are aligned with the image gradient. Thus, the filters may reduce spurious values and improve the continuity of the fault prediction through localized blurring of the values in the initially generated fault probability, which in turn may merge discontinuous patches into a same fault.

The fault probability may further be pre-processed by thinning. Thinning of the processed fault probability volume may be achieved in one of several ways. In one way, thinning may be performed by skeletonization, which may isolate curvilinear features and convert the fault probability volume into binary values by applying a threshold thereto. The fault probability volume may be scaled between 0.0 and 1.0, with a threshold defining the value that discriminates between faults and not faults. In one embodiment, the threshold is determined by a user, such as through trial and error. Alternatively, the threshold may be automatically selected using image processing techniques known to one of skill in the art. Various criteria may factor into the selection of the threshold including any one, any combination, or all of: quality of the raw seismic data that was used to compute the fault probability volume; complexity of the geology; and issues intrinsic to the specific edge detection algorithm used to compute the fault probability volume. In this way, skeletonization may iteratively thin the binary data of the fault probability volume until the expression is reduced to a predetermined thickness (e.g., a single voxel thickness). An example of skeletonization is disclosed in US Patent Application Publication No. 2019/0064378, incorporated by reference in its entirety. Alternatively, skeletonization is not performed, instead using the raw fault probability, resulting in thicker representations of the features in the graph (e.g., several voxels wide).

A voxel comprises a 3D pixel where the dimensions are specific to the seismic geometry and may be measured as an inline X crossline×Z sample. For example, if the data has an inline increment of 25 m, a crossline of 25 m, and a Z of 4 ms, the voxel is 25×25×4. In this way, a voxel comprises a brick of seismic data whose size equates to the following dimensions: inline increment by crossline increment by Z sample increment. Prior to skeletonization, the faults on a Z slice would appear thick. The skeletonization process iteratively removes the exterior of those fault values until it is one voxel thick. In the context of skeletonization, the actual size of the voxel does not necessarily matter, rather that the fault values have been eroded to a single voxel. In this way, skeletonization improves computational efficiency and facilitates the use of the fault probability for the undirected graph connectivity analysis on the fault voxels.

At 130, the nodes in the undirected graph may be identified as faults based on the pre-processed fault probability. For example, responsive to filtering/skeletonization, a respective node in the undirected graph may have an associated fault probability. In the example described above, the fault probability may be assigned a value 0.0 (indicative of no fault at the respective node) or 1.0 (indicative of a fault at the respective node). Responsive to identifying the respective node as having an associated fault probability of 1, the respective node in the undirected graph may be identified as a fault node (and may be subject to further processing, as described below). Conversely, responsive to identifying the respective node as having an associated fault probability of 0, the respective node in the undirected graph may be ignored or may be identified as a no-fault node.

At 140, for a respective node identified as a fault, its neighbor nodes may be analyzed to determine whether to establish a connection between the respective node and its neighbor node in order to generate a connection in the undirected graph. As one example, the fault probability associated with respective neighbor node(s) may be analyzed to determine whether to establish the connection between the respective node and the respective neighbor node. In one embodiment, only a directly adjacent neighbor node is analyzed. For example, the fault probability of 1.0 (indicative of a fault at the respective neighbor node) of the directly adjacent neighbor node (in 3-D space, there may be 26 direct adjacent neighbor nodes) results in establishing the connection between the respective node and the respective directly adjacent neighbor node. Conversely, the fault probability of 0.0 (indicative of no fault at the respective neighbor node) in the directly adjacent neighbor node results in no establishing the connection between the respective node and the respective directly adjacent neighbor node.

In an alternate embodiment, multiple direct neighbor nodes are analyzed. For example, both the directly adjacent neighbor node and the second directly adjacent neighbor node may be analyzed (in 3-D space, there may be 124 directly adjacent neighbor nodes and second directly adjacent neighbor nodes) to determine whether to establish a connection (e.g., if both the directly adjacent neighbor node and the second directly adjacent neighbor node have a fault probability=1.0, the connection is established; if both the directly adjacent neighbor node and the second directly adjacent neighbor node do not have a fault probability=1.0, the connection is not established). In this regard, neighboring nodes (either within 1 node of the respective node or within 2 nodes of the respective node) may be analyzed.

Thus, the undirected graph may be generated by analyzing the fault probability. In one or some embodiments, that undirected graph is a graph, including a set of objects (called vertices or nodes) that are connected together, where one, some or all of the edges are bidirectional. This in in contrast to a directed graph where the edges point in a direction. When drawing an undirected graph, the edges may be drawn as lines between pairs of nodes.

As discussed above, typical fault extraction methodologies may fail to correctly determine where faults branch or overlap (e.g., incorrectly identify two overlapping faults as connected). In one or some embodiments, the fault extraction process utilizes an undirected graph to capture connectivity between adjacent voxels.

The undirected graph comprises a data structure for storing relationships and quantitative measures associated with those relationships. In particular, the undirected graph does not have any measure of direction or "flow" to the established relationships stored in the graph data structure; rather, the relationships between the voxels may be used to connect the adjacent voxels (e.g., by using the fault probability), and in turn undergo additional analysis for fault extraction (such as removal of connections, as discussed in further detail below), thereby leveraging the undirected graph. Thus, undirected graphing may be used to connect the skeletonized (e.g., single-voxel width) faults.

At 150, one or more attributes associated with the nodes may be analyzed in order to remove connections between the nodes. In particular, after the connections in the undirected graph are established, one or more connections may be removed subject to further analysis. As one example, one or more attributes associated with the respective node and/or with the respective connection may be analyzed in order to determine whether to remove the connection.

Various attribute(s), which may indicate at least one aspect of any one, any combination or all of node, the connection, or the fault, may be analyzed in order to determine whether to remove the connection. As one example, attribute(s) may be indicative of orientation or attitude of a fault. In particular, fault orientations may be calculated from the skeletonized fault probability volume using various methodologies, such as principal component analysis (PCA), which computes localized image orientations. In this way, PCA is a statistical analysis process for identifying axes of variation from a series of observations/points. From this, one may compute the normal vector of the 3D data at each voxel, which may then be used to compute dip and azimuth (or other attributes) using fundamental trigonometry. This process results in the generation of two separate volumes that describe the orientation of the faults at any given location including: (1) local structural azimuth; and (2) local structural dip. Local structural azimuth describes how the fault is oriented in a compass sense, whereas the local structural dip describes the angle (e.g., in degrees) that the fault is dipping. Other measures of determining object orientation, such as gradient structure tensor or the like, are contemplated. Thus, one or more attributes (e.g., one or both of the local structural azimuth or the local structural dip), indicative of aspect(s) of the fault such as orientation may be used during the construction of the undirected graph as a measure of connectedness (and optionally to determine whether to remove a connection).

Another attribute comprises a number of connections at a respective node. As discussed above, the respective node may have connections to one or more neighbor nodes. In this regard, an attribute associated with the respective node may include the number of connections to neighboring nodes. As discussed further below, a search of the undirected graph may include nodes with more than "N" connections (e.g., nodes with 2, 3, 4 or more connections).

In practice, one or more rules (interchangeably referred to as filters in this context) may be used in order to determine whether to remove the connections between neighboring voxels (such as adjacent voxels) on the undirected graph. As one example, one or more rules associated with orientation may be applied in order to determine, based on the adjacent voxels, whether to generate connections or not to generate connections (or similarly, to remove one or more generated connections) in the undirected graph. Orientation between fault voxels typically does not deviate more than 5-10 degrees. In this regard, one rule may comprise maintaining the connection between adjacent voxels if the orientation between the voxels deviates less than or equal to a predetermined amount (e.g., the delta azimuth is 10 degrees or less, or 5 degrees or less), as discussed further below. Alternatively, the connection is removed/not generated between voxels if the orientation between the voxels deviates more than the predetermined amount (e.g., the delta azimuth is greater than 10 degrees, or greater than 5 degrees).

As another example, one or more rules associated with a number of adjacent voxels may be applied in order to determine whether adjacent voxels are deemed connected in the undirected graph. The number of fault branches from a node may typically be less than a certain number (e.g., no greater than 2). Specifically, a respective node having more than 3 edges likely does not indicate a through-going fault, and instead may represent overlapping faults. In this regard, another rule may comprise maintaining the connection between adjacent voxels if the number of adjacent fault voxels is less than or equal to a certain number. Conversely, the connection between adjacent voxels is severed if the number of adjacent fault voxels is greater than the certain number.

As yet another example, a context attribute, which may be generated by analyzing one or more attributes as a volumetric indication of connected quality, may comprise another indicator of connectivity. To generate the context attribute associated with a respective voxel, a window may be centered on the respective voxel and define a volume around the respective voxel. The defined window may be isotropic or anisotropic, and may be used to assess the connected quality therein. Specifically, one or more attributes may be assessed for connectivity along a plurality of directions within the window in order to generate the context attribute. The plurality of directions may emanate from the respective voxel at which the window is centered connecting to other voxels within the 3-dimensional window. In this way, values from the one or more attributes may be assessed along the plurality of directions. As one example, attributes, such as any one, any combination, or all of fault probability (raw value or skeletonized), azimuth, or dip, may be analyzed in the plurality of directions. In particular, the value for the attribute(s) associated with voxels in the plurality of directions may be summed, averaged, or normalized. After which, the sum, average, or normalized value may be compared with a predefined value, which is selected for an indication of volumetric connectivity. In one particular example, the fault probability (whether the raw fault probability or the skeletonized fault probability) may be summed, averaged or normalized along each of the plurality of directions. In the instance of averaging, the average value for the raw fault probability for the voxels in the plurality of directions may then be compared with a predefined value (e.g., 0.6 or 0.7) in order to generate the context attribute associated with the respective voxel (e.g., an average value greater than 0.6 or 0.7 is indicative of sufficient connectivity). Likewise, other attributes, such as dip, azimuth, or the like may be analyzed along the plurality of directions in order to generate the context attribute, as a volumetric indicator of connected quality for the respective voxel at the center of the window. Further, in the event that multiple metrics are used to establish connectivity, the multiple metrics may be analyzed in combination. For example, the different metrics may be weighted, such as in a linear combination $xA+yD+zP$ or the like, in order to determine connectivity.

At 160, the undirected graph may be analyzed. As discussed above, the undirected graph is a useful tool as a representation to connect voxels, and may be subject to further analysis. As part of a connected component analysis (CCA), the faults may be ranked, such as based on a number of connections. In particular, the faults may be separated into respective individual segments through the application of CCA. CCA (also known as connected component labeling) is an algorithmic application of graph theory, where subsets of connected components are uniquely labeled based on a given heuristic. In practice, CCA searches the undirected graph data structure in order to identify which voxels are connected to each other and to separate the identified voxels into new arrays. Those new arrays are deemed the individually extracted faults (and may be represented by lists of connected voxels as representing individual fault objects). For example, a first individual segment includes a first set of nodes which are connected together and deemed a first fault, a second individual segment includes a second set of nodes which are connected together and deemed a second fault, etc. The individual segments may be ranked based on the number of nodes in the respective set of nodes, with the segment having the highest number being ranked highest or first. In this regard, the analysis of the undirected graph may comprise sorting of the individual segments based on the number of nodes.

Figure 2:
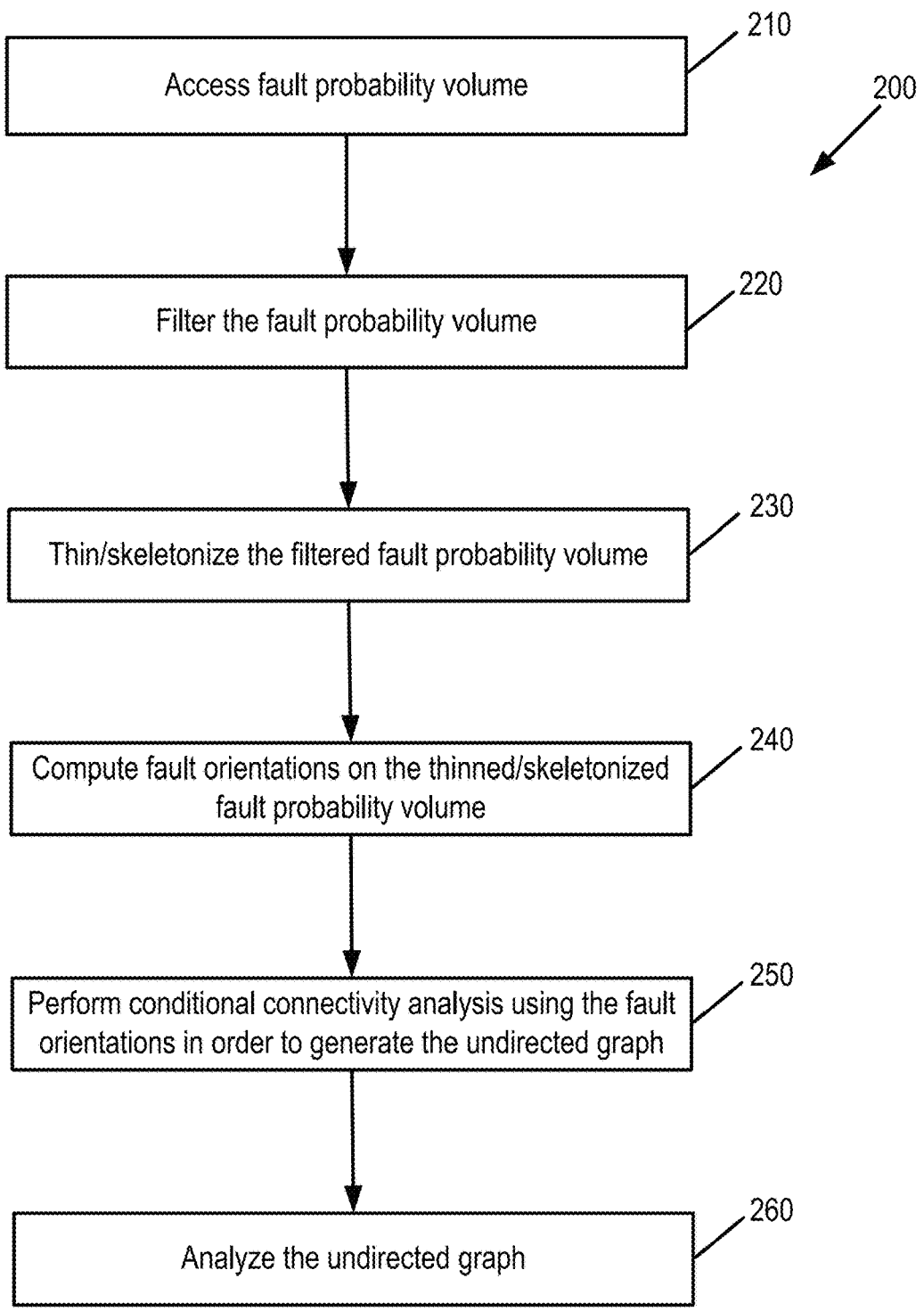
FIG. 2 is a flow diagram of a second example of extracting faults from seismic data.

FIG. 2 is a flow diagram 200 of a second example of extracting faults from seismic data, which is a more detailed flow diagram than that depicted in FIG. 1. At 210, the fault probability volume is accessed, which may thereafter be filtered at 220. At 230, the filtered fault probability volume is thinned/skeletonized. At 240, the fault orientations on the thinned/skeletonized fault probability volume are computed (such as by using PCA). At 250, conditional connectivity analysis is performed using the fault orientations in order to generate the undirected graph. For example, the fault probability volume may be analyzed in order to determine whether to connect different nodes in the undirected graph, such as discussed at 140 in FIG. 1. After which, one or more attributes, such as the fault orientations, may be used in order to remove connections in the undirected graph, such as discussed at 150 in FIG. 1. In this way, the undirected graph may represent a data structure that captures weighted connectivity between neighboring voxels. At 260, the undirected graph may be analyzed in order to extract or separate the faults into separate objects.

Figure 3:
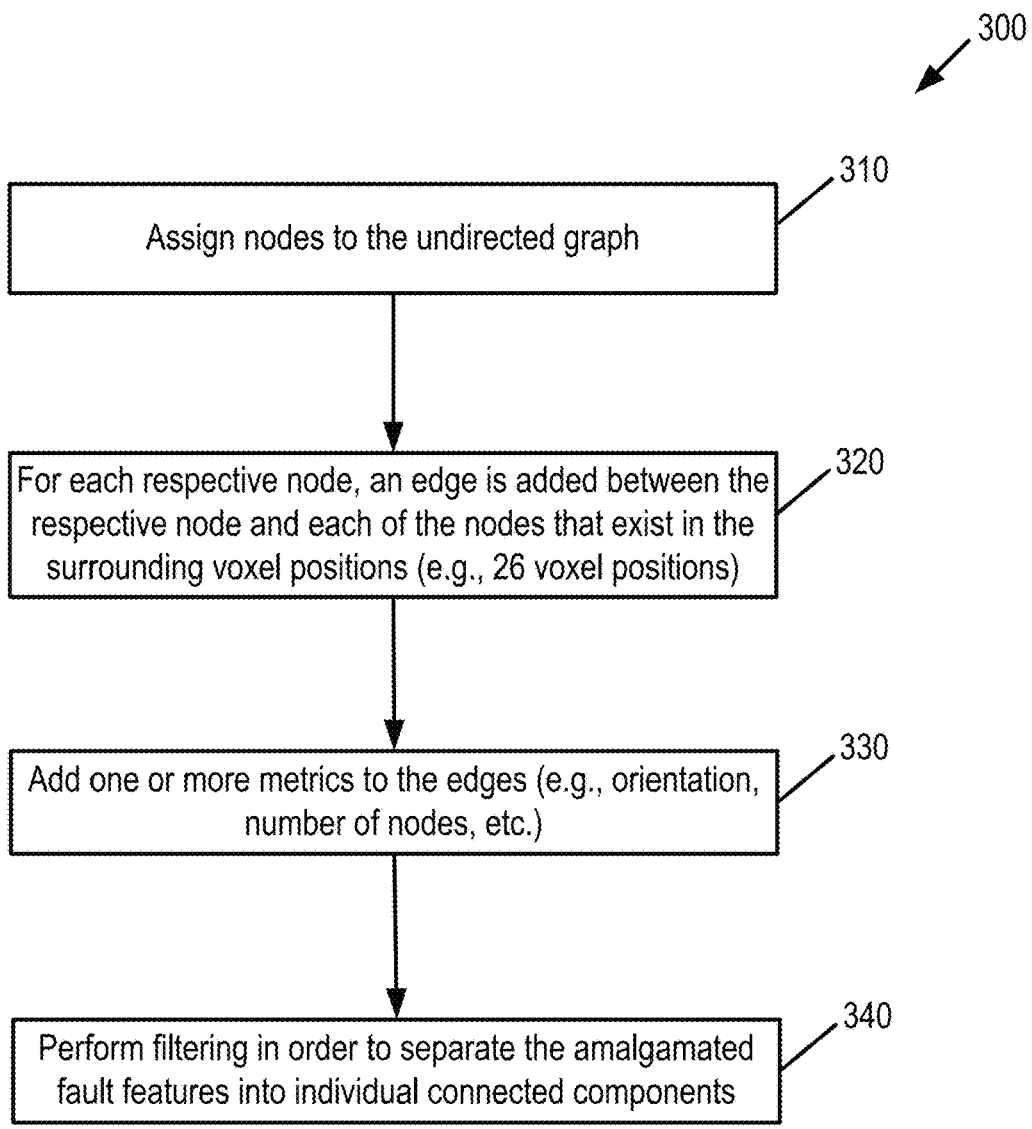
FIG. 3 is a flow diagram of an example of generating an undirected graph.

FIG. 3 is a flow diagram 300 of an example of generating an undirected graph. At 310, nodes are assigned to the undirected graph. At 320, for each respective node, depending on the fault probability, an edge is added between the respective node and each of the nodes that exist in the neighborhood around the respective node. As discussed above, neighboring nodes may comprise the 26 surrounding voxel positions for a directly adjacent neighbor, or the 124 surrounding voxel positions for both the directly adjacent neighbor and the second adjacent neighbor. For example, for respective node indicative of a fault (e.g., with a fault probability=1), the neighboring nodes may be analyzed in order to determine whether to add an edge to the undirected graph, as discussed above. At 330, one or more metrics are added to the edges and/or nodes. As discussed above, various metrics are contemplated, including orientation and number of nodes. Other metrics are contemplated. At 340, filtering, using the metrics, is performed in order to separate the amalgamated fault features into individual connected components. As discussed above, rules/filters may be used to conditionally connect the voxels.

Figures 4A, 4B:
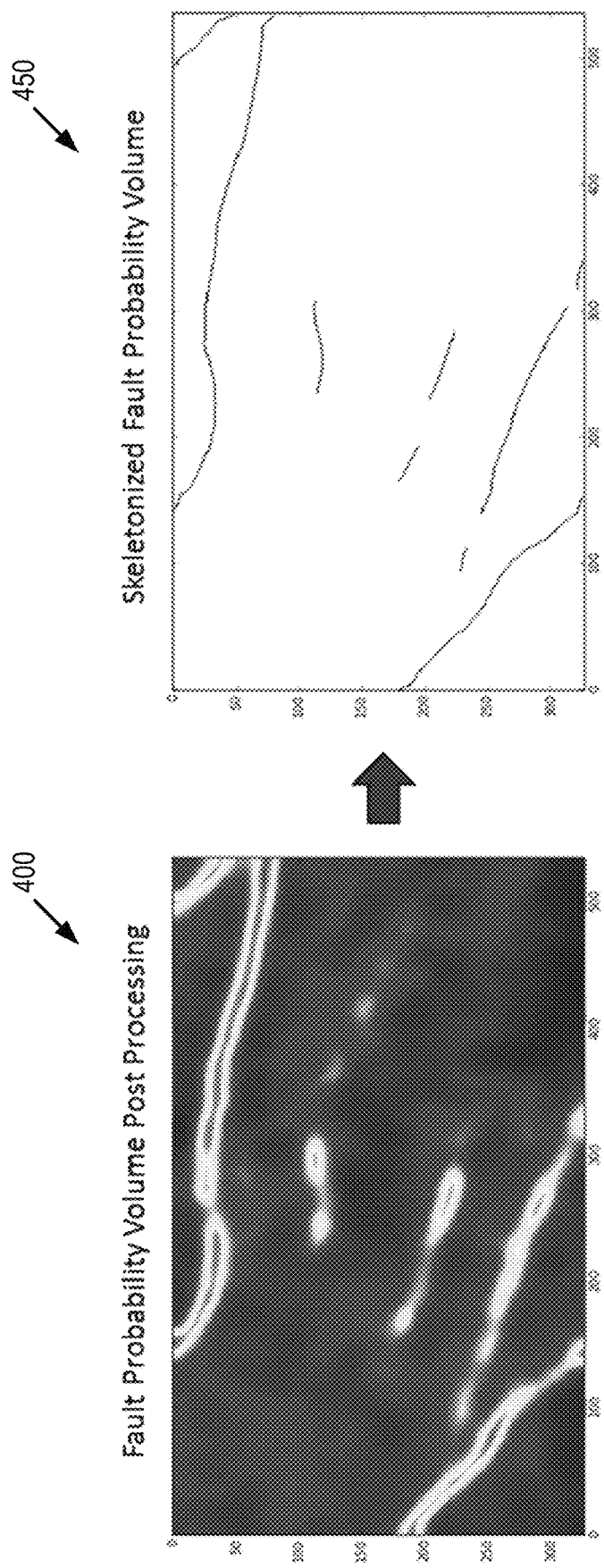

FIGS. 4A and 4B illustrate the results of the skeletonization process in which the graph 400 in FIG. 4A depicts a Z slice (parallel to the surface as if one is looking down from space) through a fault probability volume and in which the graph 450 in FIG. 4B is the skeletonized result. As shown, the faults are thinned due to skeletonization.

Figure 5B:
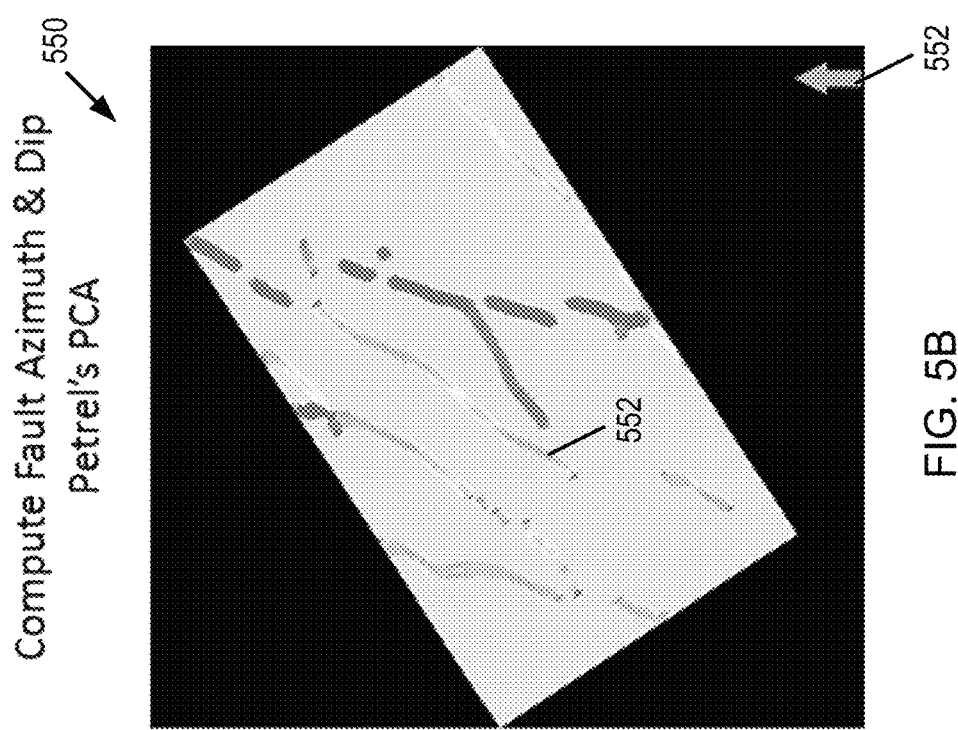
Figure 5A:
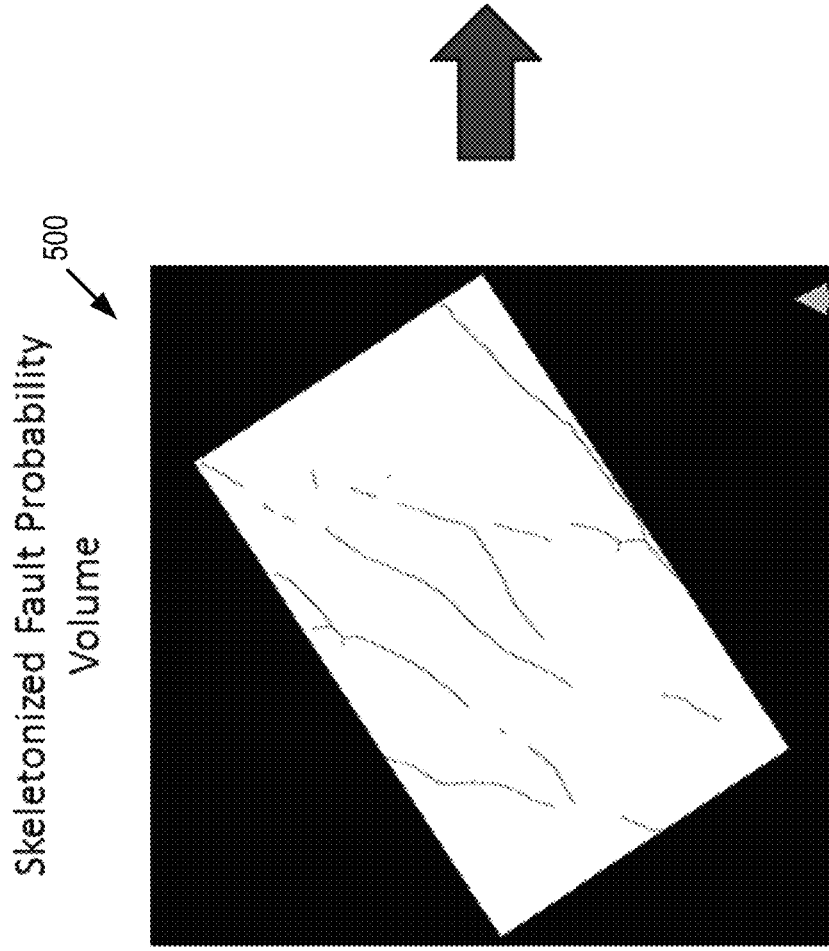

FIGS. 5A and 5B illustrate the result of fault orientation computation in which FIG. 5A depicts an illustration 500 of a skeletonized fault probability volume (e.g., a Z slice through the fault probability volume) and in which FIG. 5B depicts an illustration 550 of the fault orientations (e.g., azimuth and dip) computed therefrom. As discussed above, fault orientations may be depicted in one of several ways, such as using azimuth and dip. Illustration 550 is shown in grayscale and depicts different shades of gray that correlate to different orientations of the fault on the depicted slice. For example, color 552 depicts north orientation (e.g., within a predetermined range of degrees).

Figure 6A:
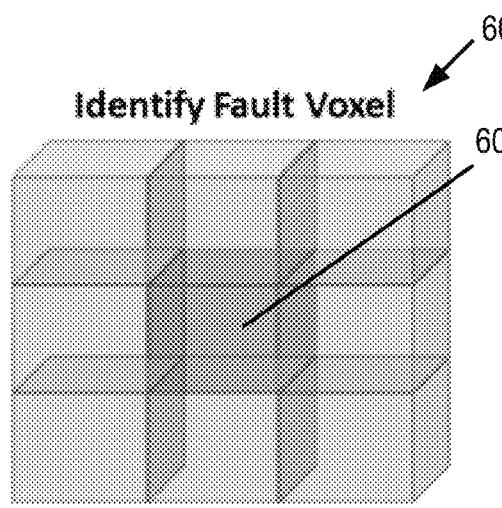
FIGS. 6A, 6B, 6C, and 6D illustrate an example of the conditional connectivity analysis in which FIG. 6A identifies voxels with values associated with fault presence, FIG. 6B searches neighboring voxels for additional fault voxels, FIG. 6C computes fault orientation variations, and FIG. 6D removes neighbors with variations greater than a predetermined threshold.
Figure 6B:
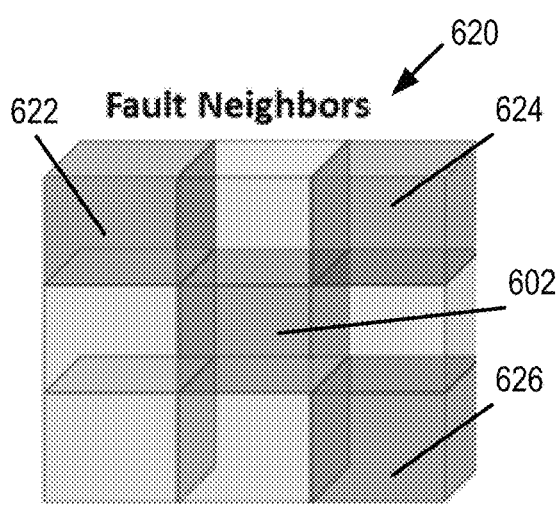
Figure 6D:
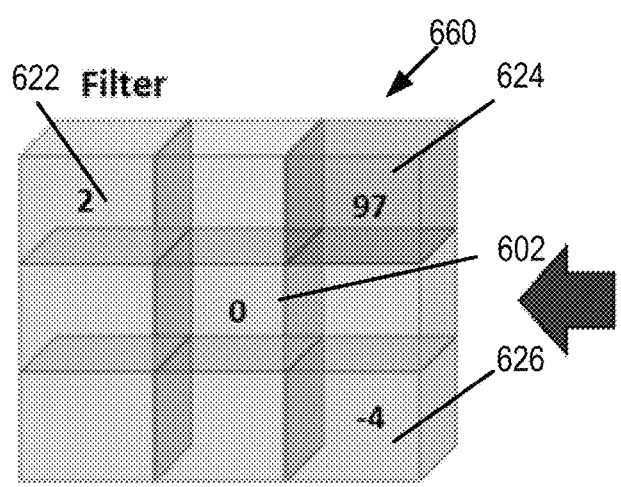
Figure 6C:
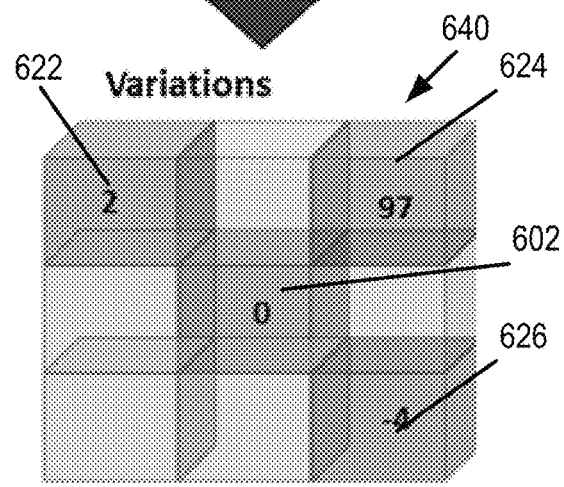

FIGS. 6A, 6B, 6C, and 6D illustrate an example of the conditional connectivity analysis in which the illustration 600 in FIG. 6A identifies voxels with values associated with fault presence, the illustration 620 in FIG. 6B searches neighboring voxels for additional fault voxels, the illustration 640 in FIG. 6C computes fault orientation variations, and the illustration 660 in FIG. 6D removes neighbors with variations greater than a predetermined threshold.

As discussed above, the fault probability volume, generated using an edge detection algorithm, includes values that typically may range from 0.0 to 1.0. The user may qualitatively assess the fault probability volume and define a threshold that partitions the fault probability volume into a binary classification where fault probabilities greater than or equal to the threshold are deemed to indicate a "fault" and probabilities less than the threshold are deemed to indicate "not a fault." The threshold may be selected within the range of 0.0 to 1.0. Optionally, the binary volume may be thinned, such as illustrated in FIGS. 4A and 4B. After which, all voxels may be searched that have a fault value (which as described above is 1). This is illustrated in FIG. 6A, which shows a fault voxel of interest 602 that identifies as a fault (e.g., a fault value=1). In this way, FIG. 6A illustrates assigning a node to the undirected graph, with the assigned node representing the IJK voxel position of a binary volume representing thinned (e.g., skeletonized) fault feature converted to graph form.

FIG. 6B illustrates identifying neighboring fault voxels 622 that are in the neighborhood of (e.g., directly touching) the fault voxel of interest 602 identified in FIG. 6A. As discussed above, directly adjacent voxels may be analyzed, such as illustrated in FIG. 6B. Alternatively, both directly adjacent voxels and secondly adjacent voxels (e.g., within two voxels) may be analyzed. In this way, the undirected graph may indicate a link between the fault voxel of interest 602 and the neighboring fault voxels 622. Once all of the voxels that are discriminated as faults are located (e.g., those that have a value greater than the threshold value), their respective 3D coordinates (I,J,K) are identified. Thereafter, the neighboring fault voxels 622, 624, 626 may be identified by iteratively examining, in 2D or 3D, all of the combinations of I,J,K plus or minus 1 (in the instance where only voxels directly touching the fault voxel of interest 602 are considered as neighboring). As an example, the initial voxel is located at (10, 10, 10), with its directly adjacent neighbors including (9, 9, 9) and (9, 11, 10). In this way, given a fault voxel, each neighbor may be assessed to determine if it is also a fault voxel, thereby defining an edge for further processing. Specifically, for each graph node, an edge may be added between it and each of the graph nodes that exist in the surrounding 26 voxel positions or the surrounding 124 voxel positions.

FIG. 6C illustrates, for the fault voxel of interest 602 and neighboring fault voxels 622, 624, 626 in order to generate the metric (or a derivation of the metric) in the undirected graph. As discussed above, one metric comprises fault orientations, which may be computed, for example, using the PCA algorithm in Petrel's volume attributes module. As discussed above, for the fault voxel of interest 602 and each of neighboring fault voxels 622, 624, 626, their respective orientations (e.g., the azimuth) may be accessed in order to compute the difference (e.g., the delta) between the fault voxel of interest 602 and each of its neighboring fault voxels 622, 624, 626 (e.g., (Azimuth(respective neighboring fault voxel)−Azimuth(fault voxel of interest)). These computed difference values are illustrated in FIG. 6C as 0 in the fault voxel of interest 602 and as 2, 97, −4 in neighboring fault voxels 622, 624, 626, respectively. In this way, the undirected graph stores the azimuth difference associated with different entries (e.g., as an attribute to the graph edges) so that filtering may be performed on the entire dataset represented in the undirected graph based on a single value, as discussed with regard to FIG. 6D. Alternatively, multiple metrics (or multiple derivations of metrics) may populate the different entries in the undirected graph.

Thus, the undirected graph, prior to application of the one or more rules, may contain numerous connected components, with some being amalgamations of several individual fault features. Applying the one or more rules results in filtering the undirected graph, thereby separating the amalgamated fault features into individual connected components.

As discussed above, one or more metrics may be used to filter the undirected graph. As one example, orientation may be used to filter the undirected graph, such as illustrated in FIG. 6D. Specifically, FIG. 6D illustrates the implementation of the rule, which may comprise connecting voxels if the difference in azimuth is less than a predetermined amount (e.g., the absolute value of the difference is 5 degrees or less). For example, neighboring fault voxel 622, with an azimuth difference with fault voxel of interest 602 of 2, is deemed to be connected to fault voxel of interest 602 (i.e., applying the rule that azimuth differences 5 degrees or less are deemed connected). Similarly, neighboring fault voxel 626, with an azimuth difference with fault voxel of interest 602 of −4, is deemed to be connected to fault voxel of interest 602. Conversely, neighboring fault voxel 624, with an azimuth difference with fault voxel of interest 602 of 97, is deemed not to be connected to fault voxel of interest 602.

Alternatively, multiple metrics may be used to filter the undirected graph. For example, the number of connections for a respective graph node may be examined. In particular, for each K-slice of the graph, each graph node may be examined for connections to more than two other nodes (representing an intersection of two or more fault features at that K-slice). Any node that is found to be a branch point is dropped from the graph. This process results in more individual connected components. Some of these connected components may already represent single fault features; however, amalgamations may still exist. A subsequent filtering step may examine the delta azimuth attribute, discussed above, which was previously assigned to all graph edges. Using a maximum threshold (e.g., a delta azimuth equal to or less than 5 degrees), all edges of the entire graph are dropped that exceed the threshold. This additional filtering may result in additional connected components, with the additional connected components each more likely representing individual fault features. Sorting the graph by the size (e.g., the number of nodes) of connected components enables extraction of the largest fault features. In this way, the application of the rules may filter out neighboring voxels with variations in structural orientation that exceed a predefined threshold, and define connections between the voxels in the undirected graph that are consistent with fault analysis (e.g., proximity and fault orientation variability).

Figure 7C:
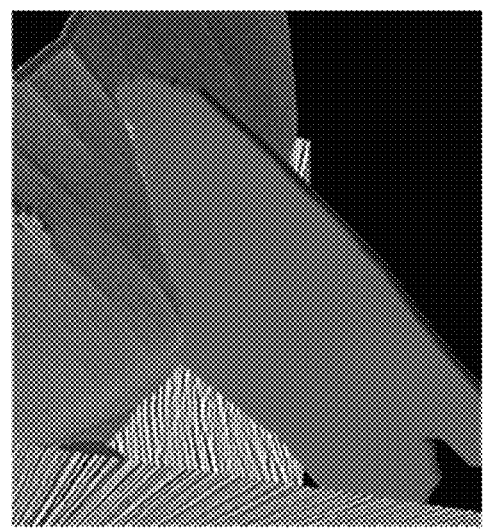
FIGS. 7A, 7B, and 7C are illustrations of extracted separate faults through connected component analysis of an undirected graph (generated using the connectivity analysis analysis) with the illustrations showing the separate fault objects as uniquely shaded.
Figure 7B:
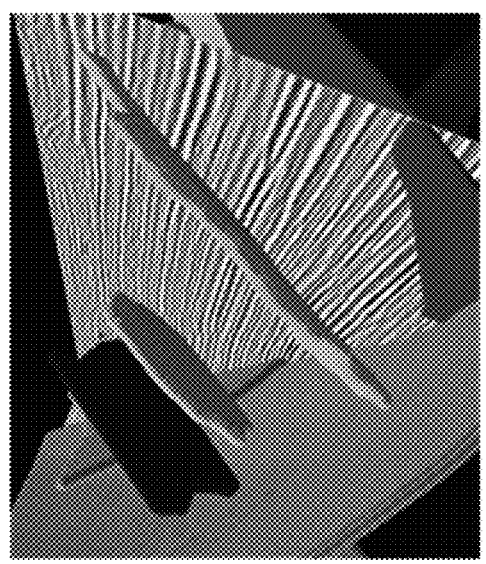
Figure 7A:
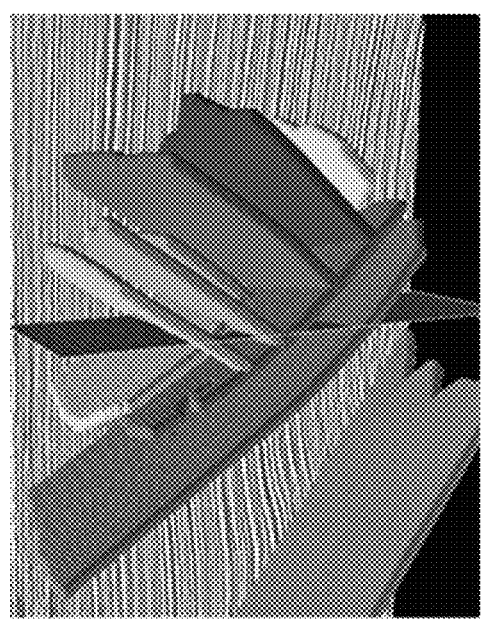

FIGS. 7A, 7B, and 7C are illustrations 700, 720, 740 of extracted separate faults through connected component analysis of an undirected graph (generated using the connectivity analysis analysis) with the illustrations showing the separate fault objects as uniquely shaded. As discussed above, various types of analysis may be applied to the undirected graph in order to separate the faults into individual segments. As one example, a connected component analysis (CCA) algorithm may be used in order to search the undirected graph data structure and return lists of connected voxels, with the lists being indicative of individual segments of faults.

Thus, after application of the one or more rules, the undirected graph is a collection of nodes (e.g., voxels) and edges (e.g., connectors) representing data of interest (e.g., fault features) from a 3D volume. Edges exist between nodes that have desired common attributes (e.g., fault probability value, azimuth, dip). Further, connected components, which may be identified using CCA, are collections of graph nodes that are interconnected by edges, but isolated from other portions of the graph through the lack of connecting edges.

Figure 8:
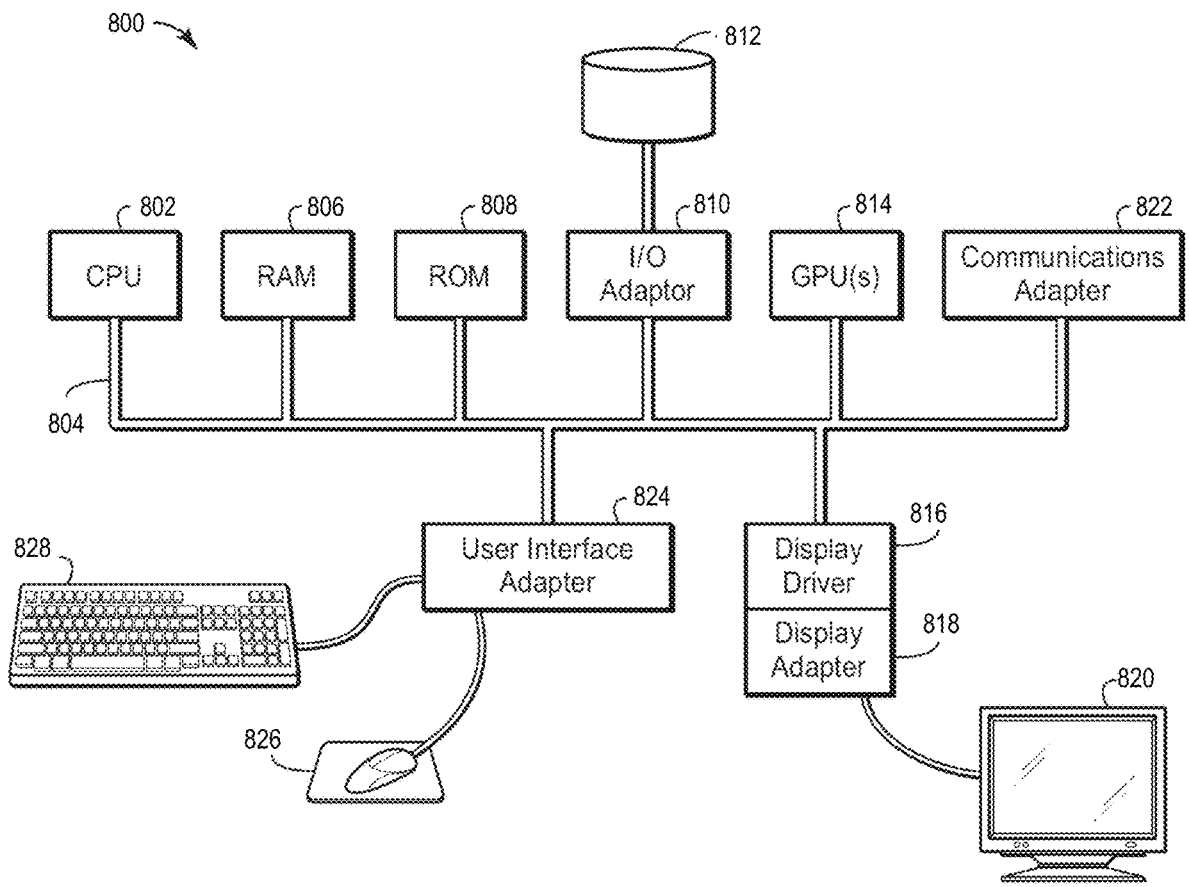
FIG. 8 is a diagram of an exemplary computer system that may be utilized to implement the methods described herein.

In all practical applications, the present technological advancement must be used in conjunction with a computer, programmed in accordance with the disclosures herein. For example, FIG. 8 is a diagram of an exemplary computer system 800 that may be utilized to implement methods described herein. A central processing unit (CPU) 802 is coupled to system bus 804. The CPU 802 may be any general-purpose CPU, although other types of architectures of CPU 802 (or other components of exemplary computer system 800) may be used as long as CPU 802 (and other components of computer system 800) supports the operations as described herein. Those of ordinary skill in the art will appreciate that, while only a single CPU 802 is shown in FIG. 8, additional CPUs may be present. Moreover, the computer system 800 may comprise a networked, multi-processor computer system that may include a hybrid parallel CPU/GPU system. The CPU 802 may execute the various logical instructions according to various teachings disclosed herein. For example, the CPU 802 may execute machine-level instructions for performing processing according to the operational flow described.

The computer system 800 may also include computer components such as non-transitory, computer-readable media. Examples of computer-readable media include a random access memory (RAM) 806, which may be SRAM, DRAM, SDRAM, or the like. The computer system 800 may also include additional non-transitory, computer-readable media such as a read-only memory (ROM) 808, which may be PROM, EPROM, EEPROM, or the like. RAM 806 and ROM 808 hold user and system data and programs, as is known in the art. The computer system 800 may also include an input/output (I/O) adapter 810, a graphics processing unit (GPU) 814, a communications adapter 822, a user interface adapter 824, a display driver 816, and a display adapter 818.

The I/O adapter 810 may connect additional non-transitory, computer-readable media such as storage device(s) 812, including, for example, a hard drive, a compact disc (CD) drive, a floppy disk drive, a tape drive, and the like to computer system 800. The storage device(s) may be used when RAM 806 is insufficient for the memory requirements associated with storing data for operations of the present techniques. The data storage of the computer system 800 may be used for storing information and/or other data used or generated as disclosed herein. For example, storage device(s) 812 may be used to store configuration information or additional plug-ins in accordance with the present techniques. Further, user interface adapter 824 couples user input devices, such as a keyboard 828, a pointing device 826 and/or output devices to the computer system 800. The display adapter 818 is driven by the CPU 802 to control the display on a display device 820 to, for example, present information to the user such as subsurface images generated according to methods described herein.

The architecture of computer system 800 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 800 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

Exemplary embodiments of the invention are also described with further reference below.

Embodiment 1: A computer-implemented method for extracting faults in a subsurface, the method comprising: accessing fault probability generated from seismic data; establishing connections in an undirected graph based on the fault probability; removing at least some connections in the undirected graph based on analyzing one or more attributes associated with the at least some connections or nodes associated with the at least some connections; and analyzing the undirected graph in order to extract the faults in the subsurface.

Embodiment 2: The method of Embodiment 1, wherein the one or more attributes comprise fault probability, a number of connections, dip, azimuth or context.

Embodiment 3: The method of any of Embodiments 1 or 2, wherein removing at least some connections in the undirected graph is based on orientation of the fault.

Embodiment 4: The method of any of Embodiments 1-3, wherein removing the at least some connections in the undirected graph based on the orientation of the fault comprises: for a respective connection comprising a first node and a second node, analyzing a change in orientation between the first node and the second node; and removing the connection if the change in the orientation between the first node and the second node is greater than a predetermined amount.

Embodiment 5: The method of any of Embodiments 1-4, wherein the change in the orientation comprises a change in azimuth between the first node and the second node.

Embodiment 6: The method of any of Embodiments 1-5, wherein removing the at least some connections is based on a number of connections at the nodes associated with the at least some connections.

Embodiment 7: The method of any of Embodiments 1-6, wherein at least one connection emanating from a respective node is removed based on the number of connections at the respective node being greater than a predetermined number.

Embodiment 8: The method of any of Embodiments 1-7, wherein the at least some connections in the undirected graph are removed based on analyzing a context attribute comprising a volumetric indication of connected quality between nodes.

Embodiment 9: The method of any of Embodiments 1-8, wherein the fault probability comprises a fault probability volume; further comprising skeletonizing the fault probability volume; and wherein establishing the connections in an undirected graph is based on the skeletonized fault probability volume.

Embodiment 10: The method of any of Embodiments 1-9, wherein establishing the connections in an undirected graph based on the fault probability comprises: analyzing the fault probabilities for neighboring nodes that are directly adjacent to a respective node; and responsive to the fault probabilities for the neighboring nodes that are directly adjacent to the respective node indicating the fault, establishing connections between the respective node and all or a subset of the neighboring nodes.

Embodiment 11: The method of any of Embodiments 1-10, wherein establishing the connections in an undirected graph based on the fault probability comprises: analyzing the fault probabilities for neighboring nodes that are within 2 nodes of a respective node; and responsive to the fault probabilities for the neighboring nodes that are within 2 nodes of the respective node indicating the fault, establishing connections between the respective node and all or a subset of the neighboring nodes.

Embodiment 12: The method of any of Embodiments 1-11, further comprising managing hydrocarbons in the subsurface based on the faults extracted in the subsurface.

Embodiment 13: The method of any of Embodiments 1-12, further comprising: generating an image based on the faults extracted in the subsurface; and outputting the image on a display.

Embodiment 14: A computer-implemented method for extracting faults in a subsurface, the method comprising: accessing fault probability generated from seismic data; generating connections in an undirected graph based on the fault probability and based on orientation of the fault; and analyzing the undirected graph in order to extract the faults in the subsurface.

Embodiment 15: The method of Embodiment 14: wherein generating connections in the undirected graph based on the fault probability and based on the orientation of the fault comprises: establishing connections within the undirected graph based on the fault probability; and removing the connections based on analysis of the orientation of the fault.

Embodiment 16: The method of any of Embodiments 14 or 15, wherein establishing connections within the undirected graph based on the fault probability comprises: for a respective node in the undirected graph that is indicative of a fault, analyzing fault probabilities for neighboring nodes to the respective node in order to determine whether to establish the connections between the respective node and the neighboring nodes.

Embodiment 17: The method of any of Embodiments 14-16, wherein the fault probability comprises a fault probability volume; further comprising thinning the fault probability volume; and wherein the thinned fault probability volume is used to generate the connections in the undirected graph.

Embodiment 18: The method of any of Embodiments 14-17, wherein thinning comprises skeletonization.

Embodiment 19: The method of any of Embodiments 14-18, further comprising filtering the fault probability volume prior to skeletonization.

Embodiment 20: The method of any of Embodiments 14-19, wherein analyzing the undirected graph comprises ranking sets of connections based on a number of nodes in sets of connections.

The invention claimed is:

1. A computer-implemented method for extracting faults in a subsurface, the method comprising:
accessing fault probability generated from seismic data;
establishing connections in an undirected graph based on the fault probability;
removing at least some connections in the undirected graph based on analyzing one or more attributes associated with the at least some connections or nodes associated with the at least some connections;
analyzing the undirected graph in order to extract the faults in the subsurface; and
using the faults extracted in the subsurface in one or both of: a development stage in which one or more actions are performed in the subsurface; or an extraction stage in which hydrocarbons are extracted from the subsurface.

2. The method of claim 1, wherein the one or more attributes comprise fault probability, a number of connections, dip, azimuth or context.

3. The method of claim 1, wherein removing at least some connections in the undirected graph is based on orientation of the fault.

4. The method of claim 3, wherein removing the at least some connections in the undirected graph based on the orientation of the fault comprises:
for a respective connection comprising a first node and a second node, analyzing a change in orientation between the first node and the second node; and
removing the connection if the change in the orientation between the first node and the second node is greater than a predetermined amount.

5. The method of claim 4, wherein the change in the orientation comprises a change in azimuth between the first node and the second node.

6. The method of claim 1, wherein removing the at least some connections is based on a number of connections at the nodes associated with the at least some connections.

7. The method of claim 6, wherein at least one connection emanating from a respective node is removed based on the number of connections at the respective node being greater than a predetermined number.

8. The method of claim 1, wherein the at least some connections in the undirected graph are removed based on analyzing a context attribute comprising a volumetric indication of connected quality between nodes.

9. The method of claim 1, wherein the fault probability comprises a fault probability volume;
further comprising skeletonizing the fault probability volume; and
wherein establishing the connections in an undirected graph is based on the skeletonized fault probability volume.

10. The method of claim 1, wherein establishing the connections in an undirected graph based on the fault probability comprises:
analyzing the fault probabilities for neighboring nodes that are directly adjacent to a respective node; and
responsive to the fault probabilities for the neighboring nodes that are directly adjacent to the respective node indicating the fault, establishing connections between the respective node and all or a subset of the neighboring nodes.

11. The method of claim 1, wherein establishing the connections in the undirected graph based on the fault probability comprises:
analyzing the fault probabilities for neighboring nodes that are within 2 nodes of a respective node; and
responsive to the fault probabilities for the neighboring nodes that are within 2 nodes of the respective node indicating the fault, establishing connections between the respective node and all or a subset of the neighboring nodes.

12. The method of claim 1, further comprising:
generating an image based on the faults extracted in the subsurface; and
outputting the image on a display.

13. A computer-implemented method for extracting faults in a subsurface, the method comprising:
accessing fault probability generated from seismic data;
generating connections in an undirected graph based on the fault probability and based on orientation of the faults;
analyzing the undirected graph in order to extract the faults in the subsurface; and
using the faults extracted in the subsurface in one or both of: a development stage in which one or more actions are performed in the subsurface; or an extraction stage in which hydrocarbons are extracted from the subsurface.

14. The method of claim 13, wherein generating connections in the undirected graph based on the fault probability and based on the orientation of the faults comprises:
establishing connections within the undirected graph based on the fault probability; and
removing the connections based on analysis of the orientation of the faults.

15. The method of claim 14, wherein establishing connections within the undirected graph based on the fault probability comprises:
for a respective node in the undirected graph that is indicative of a fault, analyzing fault probabilities for neighboring nodes to the respective node in order to determine whether to establish the connections between the respective node and all or a subset of the neighboring nodes.

16. The method of claim 13, wherein the fault probability comprises a fault probability volume;
further comprising thinning the fault probability volume; and
wherein the thinned fault probability volume is used to generate the connections in the undirected graph.

17. The method of claim 16, wherein thinning comprises skeletonization.

18. The method of claim 17, further comprising filtering the fault probability volume prior to skeletonization.

19. The method of claim 13, wherein analyzing the undirected graph comprises ranking sets of connections based on a number of nodes in the sets of connections.

20. The method of claim 1, wherein the development stage includes drilling one or more wells.

* * * * *